US012597267B2

(12) United States Patent
Nandiraju et al.

(10) Patent No.: US 12,597,267 B2
(45) Date of Patent: Apr. 7, 2026

(54) METHOD AND SYSTEM FOR MULTI-OBJECT TRACKING AND NAVIGATION WITHOUT PRE-SEQUENCING

(71) Applicant: Tata Consultancy Services Limited, Mumbai (IN)

(72) Inventors: Gireesh Nandiraju, Hyderabad (IN); Ayush Agrawal, Hyderabad (IN); Ahana Datta, Hyderabad (IN); Snehasis Banerjee, Kolkata (IN); Mohan Sridharan, Birmingham (GB); Madhava Krishna, Hyderabad (IN); Brojeshwar Bhowmick, Kolkata (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 224 days.

(21) Appl. No.: 18/645,882

(22) Filed: Apr. 25, 2024

(65) Prior Publication Data

US 2024/0362924 A1 Oct. 31, 2024

(30) Foreign Application Priority Data

Apr. 27, 2023 (IN) .............................. 202321030491

(51) Int. Cl.
*G06V 20/58* (2022.01)
*G05D 1/243* (2024.01)
(Continued)

(52) U.S. Cl.
CPC ............. *G06V 20/58* (2022.01); *G05D 1/243* (2024.01); *G05D 1/246* (2024.01); *G05D 1/2467* (2024.01);
(Continued)

(58) Field of Classification Search
None
See application file for complete search history.

(56) References Cited

U.S. PATENT DOCUMENTS

| | | | | |
|---|---|---|---|---|
| 11,548,146 B2* | 1/2023 | Sun | ......................... | G06N 99/00 |
| 2019/0073353 A1* | 3/2019 | Yu | .......................... | G06N 3/006 |

(Continued)

OTHER PUBLICATIONS

Chaplot et al., "Object Goal Navigation using Goal-Oriented Semantic Exploration," (2020).

(Continued)

*Primary Examiner* — Vivek D Koppikar
*Assistant Examiner* — David Ruben Pedersen
(74) *Attorney, Agent, or Firm* — Finnegan, Henderson, Farabow, Garrett & Dunner, LLP

(57) ABSTRACT

This disclosure relates generally to method and system for multi-object tracking and navigation without pre-sequencing. Multi-object navigation is an embodied AI task where object navigation only searches for an instance of at least one target object where a robot localizes an instance to locate target objects associated with an environment. The method of the present disclosure employs a deep reinforcement learning (DRL) based framework for sequence agnostic multi-object navigation. The robot receives from an actor critic network a deterministic local policy to compute a low-level navigational action to navigate along a shortest path calculated from a current location of the robot to the long-term goal to reach the target object. Here, a deep reinforcement learning network is trained to assign the robot with a computed reward function when the navigational action is performed by the robot to reach an instance of the plurality of target objects.

20 Claims, 5 Drawing Sheets

(51) Int. Cl.

| | |
|---|---|
| *G05D 1/246* | (2024.01) |
| *G05D 1/633* | (2024.01) |
| *G05D 1/644* | (2024.01) |
| *G06T 7/246* | (2017.01) |
| *G06V 10/82* | (2022.01) |
| *G06V 20/70* | (2022.01) |
| *G05D 101/00* | (2024.01) |
| *G05D 101/15* | (2024.01) |

(52) U.S. Cl.
CPC ............. *G05D 1/633* (2024.01); *G05D 1/644* (2024.01); *G06T 7/246* (2017.01); *G06V 10/82* (2022.01); *G06V 20/70* (2022.01); *G05D 2101/15* (2024.01); *G05D 2101/22* (2024.01); *G06T 2207/20084* (2013.01); *G06T 2207/30261* (2013.01)

(56) References Cited

U.S. PATENT DOCUMENTS

| | | | |
|---|---|---|---|
| 2020/0241574 A1* | 7/2020 | Lin ....................... | G05D 1/0088 |
| 2022/0187847 A1* | 6/2022 | Cella ................ | G05B 19/41885 |
| 2023/0090824 A1* | 3/2023 | Osindero ............... | G06N 3/006 |
| | | | 706/25 |

OTHER PUBLICATIONS

Qiu et al., "Learning hierarchical relationships for object-goal navigation," (2020).

* cited by examiner

300

| continuously receiving a plurality of images of an environment via a sensor controlled by a robot while in motion, wherein each of the plurality of images comprises a plurality of objects present in a field of view of the robot, and receiving by a user task comprising a plurality of target objects from among the plurality of objects to be located in the environment | 302 |

| iteratively creating a semantic map of the environment at every first timestep of each episode by using an odometry pose readings and RGB-D observations of the plurality of objects, wherein the semantic map indicates the robot an arrangement of a plurality of obstacles, the plurality of objects and an associated vacant space in the environment | 304 |

| identifying by the robot the plurality of target objects from among the plurality of objects by processing the semantic map | 306 |

| extracting via an encoder network a plurality of high-level feature embeddings of the plurality of target objects by using the semantic map and dynamically identifying change in position of the plurality of target objects and the robot in the environment | 308 |

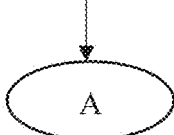

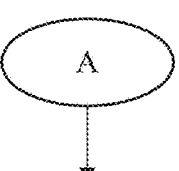

A sending the plurality of high-level feature embeddings and a plurality of transition states to an actor-critic network that repetitively computes a long-term goal for each episode, wherein the long-term goal is a region of the semantic map where the robot navigates in search of an instance of the plurality of target objects

310 receiving by the robot from the actor critic network a deterministic local policy to compute a low-level navigational action to navigate along a shortest path calculated from a current location of the robot to the long-term goal to reach the target object among the plurality of target objects

312 navigating in accordance with the deterministic local policy to a next location of the target object from among the plurality of target objects, wherein a trained deep reinforcement learning network executed by the one or more hardware processors rewards the robot with at least one of a reward among a plurality of rewards for performing a navigational action on reaching each target object location among the plurality of target objects

314 utilizing a deep reinforcement learning network trained to assign the robot with a computed reward function when the navigational action is performed by the robot to reach an instance of the plurality of target objects, wherein the robot ends the task as one of a successful task when the plurality of target objects are successfully navigated by the robot, and a failure task when the semantic map predicts no space to navigate in the environment.

METHOD AND SYSTEM FOR MULTI-OBJECT TRACKING AND NAVIGATION WITHOUT PRE-SEQUENCING

PRIORITY CLAIM

This U.S. patent application claims priority under 35 U.S.C. § 119 to: Indian Patent Application No. 202321030491, filed on Apr. 27, 2023. The entire contents of the aforementioned application are incorporated herein by reference.

TECHNICAL FIELD

The disclosure herein generally relates to object navigation and, more particularly, to method and system for multi-object tracking and navigation without pre-sequencing.

BACKGROUND

Visual object navigation is a critical task of embodied artificial intelligence (AI), which responds to user request and allows assistive agent to navigate towards goal object. Assistive agent that operate and navigate in human-occupied environments require new approaches involving social skills. The ability to track a moving object is critical for home service assistive agents. Locating instances of specific objects is a key task for the assistive agent in such a home service environment. Aside from tracking a target object, the assistive agent actively decides motion in order to track the moving object while also navigating through an unknown environment and avoiding other obstacles such as other moving or static objects in the environment.

In an existing technique, object search tasks aims to navigate an instance of a specific target object in an unseen environment. Reinforcement Learning (RL) techniques are employed for mapping pixels directly to actions suitable for accomplishing such tasks. However, such techniques find it difficult to generalize to previously unseen scenarios since they lack to build a representation of the unseen environment. In another existing technique the assistive agent implicitly learn the navigation problem through recursive trials before sending aggregate sensory input to the Reinforcement Learning (RL) framework. In another existing method the assistive agents locates the target object by finding similarity between current observation and the target observation through a trained Siamese Network. However, existing methods lack in utilizing prior knowledge or semantic context to locate specific target object in the unseen environment.

SUMMARY

Embodiments of the present disclosure present technological improvements as solutions to one or more of the above-mentioned technical problems recognized by the inventors in conventional systems. For example, in one embodiment, a system for multi-object tracking and navigation through pre-sequencing is provided. The system includes continuously receiving a plurality of images of an environment via a sensor controlled by a robot while in motion, wherein each of the plurality of images comprises a plurality of objects present in a field of view of the robot, and receiving by the robot, a user task comprising a plurality of target objects from among the plurality of objects to be located in the environment. Further, a semantic map of the environment at every first timestep of each episode is iteratively created by using an odometry pose readings and RGB-D observations of the plurality of objects. The semantic map indicates the robot, an arrangement of a plurality of obstacles, the plurality of objects and an associated vacant space in the environment. The robot identifies the plurality of target objects from among the plurality of objects by processing the semantic map. Furthermore, an encoder network extracts a plurality of high-level feature embeddings of the plurality of target objects by using the semantic map and dynamically identifying change in position of the plurality of target objects and the robot in the environment. Further, the plurality of high-level feature embeddings and a plurality of transition states associated with change in position of the plurality of target objects are sent to an actor-critic network that repetitively computes a long-term goal for each episode.

The long-term goal is a region of the semantic map where the robot navigates in search of an instance of the plurality of target objects. The actor critic network receives a deterministic local policy to compute a low-level navigational action to navigate along a shortest path calculated from a current location of the robot to the long-term goal to reach the target object among the plurality of target objects. Further, from a current location to a next location of the target object from among the plurality of target objects is navigated based on the deterministic local policy. A trained deep reinforcement learning network executed by the robot with at least one of a reward among a plurality of rewards for performing a navigational action on reaching each target object location among the plurality of target objects. The trained deep reinforcement learning network is utilized to assign the robot with a computed reward function when the navigational action is performed by the robot to reach an instance of the plurality of target objects. The robot ends the task as one of a successful task when the plurality of target objects are successfully navigated by the robot, and a failure task when the semantic map predicts no space to navigate in the environment.

In another aspect, a method for multi-object tracking and navigation through pre-sequencing is provided. The method includes continuously receiving a plurality of images of an environment via a sensor controlled by a robot while in motion, wherein each of the plurality of images comprises a plurality of objects present in a field of view of the robot, and receiving by the robot, a user task comprising a plurality of target objects from among the plurality of objects to be located in the environment. Further, a semantic map of the environment at every first timestep of each episode is iteratively created by using an odometry pose readings and RGB-D observations of the plurality of objects. The semantic map indicates the robot, an arrangement of a plurality of obstacles, the plurality of objects and an associated vacant space in the environment. The robot identifies the plurality of target objects from among the plurality of objects by processing the semantic map. Furthermore, an encoder network extracts a plurality of high-level feature embeddings of the plurality of target objects by using the semantic map and dynamically identifying change in position of the plurality of target objects and the robot in the environment. Further, the plurality of high-level feature embeddings and a plurality of transition states associated with change in position of the plurality of target objects are sent to an actor-critic network that repetitively computes a long-term goal for each episode.

The long-term goal is a region of the semantic map where the robot navigates in search of an instance of the plurality of target objects. The actor critic network receives a deterministic local policy to compute a low-level navigational action to navigate along a shortest path calculated from a current location of the robot to the long-term goal to reach the target object among the plurality of target objects. Further, from a current location to a next location of the target object from among the plurality of target objects is navigated based on the deterministic local policy. A trained deep reinforcement learning network executed by the robot with at least one of a reward among a plurality of rewards for performing a navigational action on reaching each target object location among the plurality of target objects. The trained deep reinforcement learning network is utilized to assign the robot with a computed reward function when the navigational action is performed by the robot to reach an instance of the plurality of target objects. The robot ends the task as one of a successful task when the plurality of target objects are successfully navigated by the robot, and a failure task when the semantic map predicts no space to navigate in the environment.

In yet another aspect, provides one or more non-transitory machine-readable information storage mediums comprising one or more instructions, which when executed by one or more hardware processors perform actions includes to continuously receiving a plurality of images of an environment via a sensor controlled by a robot while in motion, wherein each of the plurality of images comprises a plurality of objects present in a field of view of the robot, and receiving by the robot, a user task comprising a plurality of target objects from among the plurality of objects to be located in the environment. Further, a semantic map of the environment at every first timestep of each episode is iteratively created by using an odometry pose readings and RGB-D observations of the plurality of objects. The semantic map indicates the robot, an arrangement of a plurality of obstacles, the plurality of objects and an associated vacant space in the environment. The robot identifies the plurality of target objects from among the plurality of objects by processing the semantic map. Furthermore, an encoder network extracts a plurality of high-level feature embeddings of the plurality of target objects by using the semantic map and dynamically identifying change in position of the plurality of target objects and the robot in the environment. Further, the plurality of high-level feature embeddings and a plurality of transition states associated with change in position of the plurality of target objects are sent to an actor-critic network that repetitively computes a long-term goal for each episode.

The long-term goal is a region of the semantic map where the robot navigates in search of an instance of the plurality of target objects. The actor critic network receives a deterministic local policy to compute a low-level navigational action to navigate along a shortest path calculated from a current location of the robot to the long-term goal to reach the target object among the plurality of target objects. Further, from a current location to a next location of the target object from among the plurality of target objects is navigated based on the deterministic local policy. A trained deep reinforcement learning network executed by the robot with at least one of a reward among a plurality of rewards for performing a navigational action on reaching each target object location among the plurality of target objects. The trained deep reinforcement learning network is utilized to assign the robot with a computed reward function when the navigational action is performed by the robot to reach an instance of the plurality of target objects. The robot ends the task as one of a successful task when the plurality of target objects are successfully navigated by the robot, and a failure task when the semantic map predicts no space to navigate in the environment.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 3A and FIG. 3B is a flow diagram illustrating a method of a robot to track a plurality of target objects present in an environment implemented utilizing a deep reinforcement learning (DRL) network using the system of FIG. 1, in accordance with some embodiments of the present disclosure.

DETAILED DESCRIPTION

Figure 1:
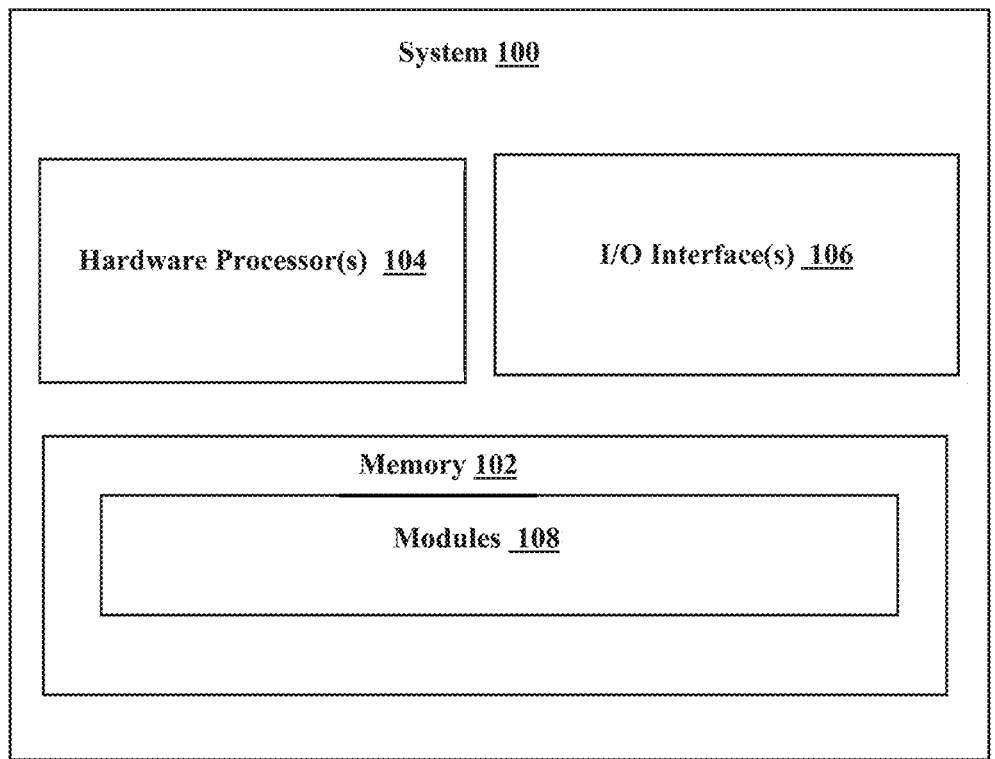
FIG. 1 illustrates an exemplary block diagram of a system (alternatively referred as multi-object navigation system), in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Autonomous navigation is an essential requirement in building intelligent embodied artificial intelligence (AI) agents or robots. Multi-object navigation is an embodied AI task wherein an agent (alternatively referred as robot) must reach any instance of the specified target object, in an unexplored environment. Existing work on object navigation only searches for an instance of at least one target object, and existing methods for multi-object navigation (MultiON) are pre-sequenced. They assume manual specification of the order in which the plurality of target objects are to be located. The method of the present disclosure extends a deep actor critic RL (DRL) framework for object navigation and includes a reward specification whose structure is unaffected by the number of target objects. Additionally, the method enables the robot to build on prior knowledge about the target environment based on prior learnings in other similar environments and attempts to reduce the distance concurrently and greedily to an instance of each of the target objects.

Embodiments herein provide a method and system for multi-object tracking and navigation without pre-sequencing. The system may be alternatively referred as a multi-object navigation system. The system enables providing a multi-object navigation task where a robot localizes an instance to locate target objects associated with an environment. The method of the present disclosure employs a deep reinforcement learning (DRL) based framework for sequence agnostic multi-object navigation. Typically, the robot is initialized at a random location in an unseen environment and is tasked to reach any instance of the target object G. In an episode of multi-object navigation task, the robot navigates to a sequence of target object G placed within the environment, where $G_i$ is the $i^{th}$ object present in the sequence. The robot has an RGB-D camera, and each episode begins when the robot starts navigation from a random location in the environment reaching to the target object. At any given timestep of the episode, the robot must map the sensor inputs to the action space. The task is termed as success if the robot reaches all the target objects and as failure if a semantic map predicts that there is no more space to explore in the environment. Additionally, the method of the present disclosure locates the target objects in an unseen environment. Also, the system and method of the present disclosure is time efficient and allows the robot to locate target objects accurately. The disclosed system is further explained with the method as described in conjunction with FIG. 1 to FIG. 4 below.

Referring now to the drawings, and more particularly to FIG. 1 through FIG. 4, where similar reference characters denote corresponding features consistently throughout the figures, there are shown preferred embodiments, and these embodiments are described in the context of the following exemplary system and/or method.

FIG. 1 illustrates an exemplary block diagram of a system (alternatively referred as multi-object navigation system), in accordance with some embodiments of the present disclosure. In an embodiment, the batch processing system 100 includes processor(s) 104, communication interface(s), alternatively referred as or input/output (I/O) interface(s) 106, and one or more data storage devices or memory 102 operatively coupled to the processor(s) 104. The system 100, with the processor(s) is configured to execute functions of one or more functional blocks of the system 100.

Referring to the components of the system 100, in an embodiment, the processor(s) 104 can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the processor(s) 104 is configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud, and the like.

The I/O interface(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface(s) 106 can include one or more ports for connecting a number of devices (nodes) of the system 100 to one another or to another server.

The memory 102 may include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes.

Figure 2:
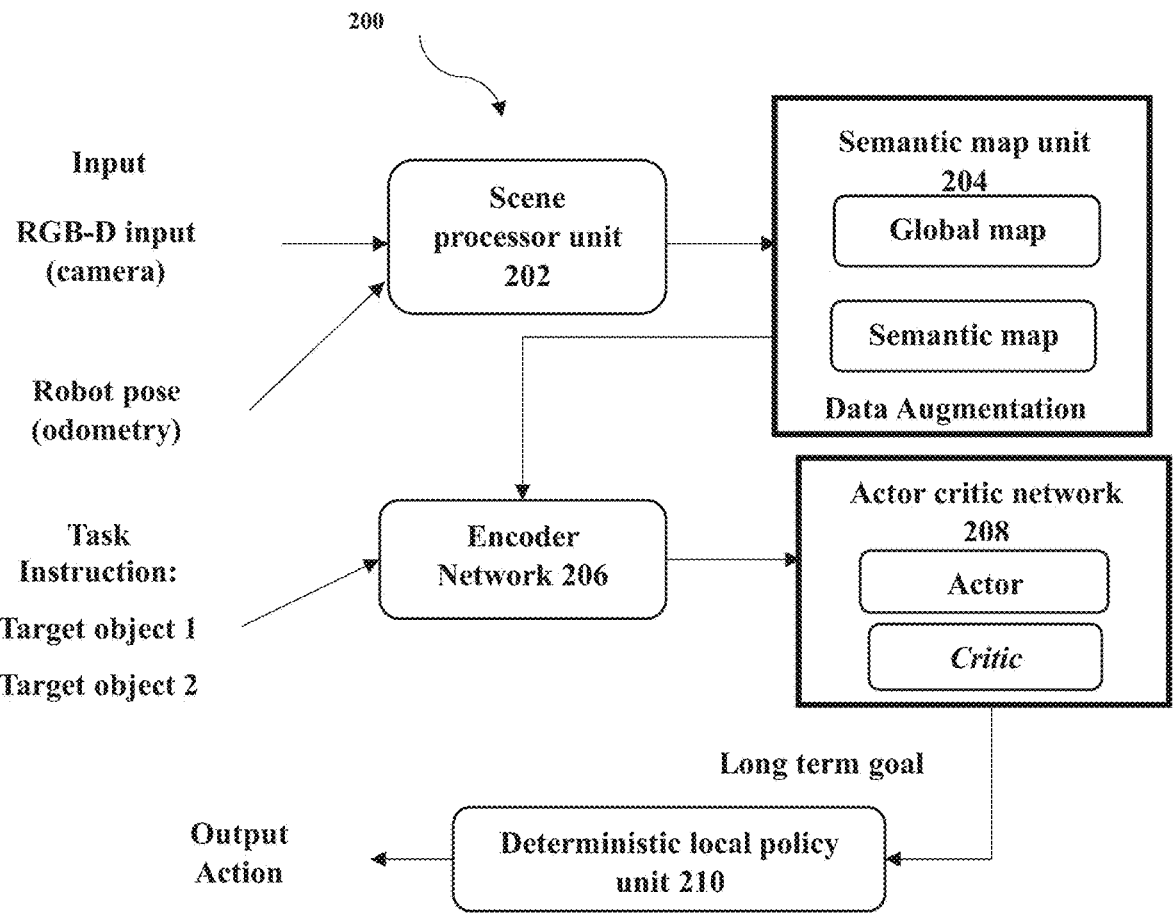
FIG. 2 is a functional block diagram illustrating an example deep reinforcement learning (DRL) network utilized by a robot for multi-object navigation performed using the system of FIG. 1, in accordance with some embodiments of the present disclosure.

In an embodiment, the memory 102 includes a plurality of modules 108 can also include various sub-modules as depicted in FIG. 2 such as a scene processor module, a semantic map module and so on. The plurality of modules 108 include programs or coded instructions that supplement applications or functions performed by the system 100 for executing different steps involved in the process of multi-object tracking and navigation implemented using an actor critic network and a trained deep reinforcement learning network of the system 100. The plurality of modules 108, amongst other things, can include routines, programs, objects, components, and data structures, which performs particular tasks or implement particular abstract data types. The plurality of modules 110 may also be used as, signal processor(s), node machine(s), logic circuitries, and/or any other device or component that manipulates signals based on operational instructions. Further, the plurality of modules 108 can be used by hardware, by computer-readable instructions executed by the one or more hardware processors 104, or by a combination thereof.

The memory 102 may comprise information pertaining to input(s)/output(s) of each step performed by the processor(s) 104 of the system 100 and methods of the present disclosure. Functions of the components of system 100, source code verification using machine learning based strategy prediction, are explained in conjunction with FIG. 2, FIG. 3A and FIG. 3B providing flow diagram, architectural overviews, and performance analysis of the system 100.

FIG. 2 is a functional block diagram illustrating an example deep reinforcement learning (DRL) network utilized by a robot for multi-object navigation performed using the system of FIG. 1, in accordance with some embodiments of the present disclosure. The system 200 may be an example of the system 100 (FIG. 1). In an example embodiment, the system 200 may be embodied in, or is in direct communication with the system, for example the system 100 (FIG. 1). In an embodiment, the system 200 may be alternatively referred as a source code verifier. The system 200 includes a scene processor unit 202, a semantic map unit 204, an encoder network 206, an actor critic network 208 and a deterministic local policy unit 210.

Referring to an example 1, a home environment comprising a plurality of objects such as a bed and a toilet in different rooms associated with the home environment. The task of a robot in such home environment is to locate instances of a plurality of target objects among a plurality of objects present in the home environment. The object goal navigation (ON) task, which tasks the robot or agent to locate a single object instance, is generalized into multi-object navigation (MultiON) task.

In an example 2, humans perform MultiON task with apparently little effort. For example, a human going on a walk may require a pair of socks, their house keys, and an umbrella, for instance. To locate these objects, they build on prior experience in this and other related (home) environments to explore a series of locations likely to contain the plurality of objects. In order to find these objects, they use their prior knowledge of this environment and similar (home) environments to investigate a number of potential hiding places for the plurality of objects. Also, they simultaneously reduce the distance needed to travel to the plurality of target objects and modify their investigation in response to observations. For instance, if socks are being looked for when keys are suddenly found on top of the cabinet, the human will pause and make sure they are the correct keys.

The scene processor unit 202 of the system 100 continuously receives a plurality of images of an environment via a sensor of a robot. The sensor may be an RGB-D camera. The plurality of images provides red, blue, and green (RGB-D) depth observations and odometry pose readings of a plurality of objects present in the environment. The robot receives a task provided by the user to locate a plurality of target objects among the plurality of objects.

The semantic map unit 204 of the system 100 fetches the RGB-D depth observations and the odometry pose readings of the plurality of objects to create a semantic map of the environment.

The encoder network 206 of the system 100 extracts a plurality of high-level feature embeddings of the plurality of target objects by using the semantic map. The robot utilizes the semantic map to dynamically identify change in position of the plurality of target objects in the environment.

The actor critic network 208 of the system 100 computes a low-level navigational action to navigate along a shortest path calculated from a current location of the robot to the long-term goal to reach the target object among the plurality of target objects. The actor critic network 208 predicts a long-term goal of the robot to reach at least one target object among the plurality of target objects.

The deterministic local policy unit 210 of the system 100 predicts a local policy used by the robot to compute low-level navigational actions to navigate along with a computed shortest path to reach at least one target object.

FIG. 3A and FIG. 3B is a flow diagram illustrating a of a robot to track a plurality of target objects present in an environment implemented utilizing a deep reinforcement learning (DRL) network using the system of FIG. 1, in accordance with some embodiments of the present disclosure. In an embodiment, the system 100 comprises one or more data storage devices or the memory 102 operatively coupled to the processor(s) 104 and is configured to store instructions for execution of steps of the method 300 by the processor(s) or one or more hardware processors 104. The steps of the method 300 of the present disclosure will now be explained with reference to the components or blocks of the system 100 as depicted in FIG. 1 through FIG. 2, and the steps of flow diagram as depicted in FIG. 3A and FIG. 3B. Although process steps, method steps, techniques or the like may be described in a sequential order, such processes, methods, and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

Referring to the steps of the method 300, at step 302 includes continuously receiving a plurality of images of an environment via a sensor controlled by one or more hardware processor of a robot while in motion, wherein each of the plurality of images comprises a plurality of objects present in a field of view of the robot and receiving by the robot from a user a task comprising a plurality of target objects from among the plurality of objects to be located in the environment. Referring to an example, the robot is assigned a task given the sequence {chair, toilet, couch and the like}. The robot is assigned a task after being given the instructions {chair, toilet, couch and the like}. The robot first searches the chair first, moves close to the chair to confirm its placement while spotting the sofa, then looks for the toilet (the second item target object in the sequence), before returning to validate the location of the couch first.

The RGB-D camera positioned in the robot captures the plurality of images of the environment for example the home environment. The plurality of images comprises a plurality of objects present in a field of view of the robot. Task of the robot received from the user is to locate the plurality of target objects G among the plurality of objects $G_i$ present in the environment.

Referring to the steps of the method 300, at step 304 includes iteratively creating via the one or more hardware processors, a semantic map of the environment at every first timestep of each episode by using an odometry pose readings and RGB-D observations of the plurality of objects, wherein the semantic map indicates the robot an arrangement of a plurality of obstacles, the plurality of objects and an associated vacant space in the environment.

The semantic map unit 204 of the system 100 creates a semantic map of the environment representing arrangement of space with a plurality of obstacles and empty space from the RGB and depth information and the odometry pose observations. The robot uses the semantic map to localize itself and processes the RGB-D data to identify and localize the plurality of target objects instances in the semantic map. The semantic map is a matrix of dimension K×M×M. This contains K channels of M×M size maps where K=C+2 and C is total number of semantic categories. The first two channels contain the plurality of obstacles and the explored areas respectively while the remaining channels contain the C object categories. The mapping procedure is a state-of-the-art method for object navigation. A pretrained mask region based convolution neural network (R-CNN) is used to estimate the semantic categories from the observed RGB information. The depth observations are used to compute point clouds and each point in the point cloud is associated with the estimated semantic categories. With the help of differentiable geometric computations over each point in the point cloud, a voxel representation is built which is then converted into a semantic map of dimension (C+2)×M×M. Further, a random shift augmentation among a plurality of data augmentation techniques is applied over the semantic map to adapt the robot to an unknown environment.

For instance, an episode with the plurality of target objects G is referred to as G−ON. The environment and the order in which each target object is to be located are both unknown to the robot. It is a pre-sequenced task if such a sequence is offered. Each target object is considered to be found when the robot navigates close to ($d_s$≤1 m) of each target object instance, the action is considered to be success to locate corresponding target object among the plurality of target objects. If at least one of the target object cannot be found within the allotted number of timesteps, the episode is said to have failed. The robot executes at least one of the four actions including a move-forward, a turn-left, a turn-right and a stop. The turn-left and the turn-right actions causes the robot to rotate between random degrees in the range between 1° to 60°, while the move-forward action advances the robot by 0.25 m.

Referring to the steps of the method 300, at step 306 includes identifying by the robot executed via the one or more hardware processors, the plurality of target objects from among the plurality of objects by processing the semantic map.

Referring to the steps of the method 300, at step 308 includes extracting via an encoder network executed by the one or more hardware processors, a plurality of high-level feature embeddings of the plurality of target objects by using the semantic map and dynamically identifying change in position of the plurality of target objects and the robot in the environment. Here, the change in position of the plurality of target objects may be identified based on the semantic map.

The encoder network 206 of the system 100 receives the estimated semantic map as input from the semantic map unit 204. The semantic map provides a current location and a prior location of the robot and the located target object. The encoder network 206 extracts the high-level feature embeddings of the plurality of target objects which are then used by an actor network 208 to obtain a long-term goal. The encoder network 206 comprises four convolutional layers with 3×3 kernels and 32 channels. Further, a rectified linear unit (ReLU) activation is applied after each convolutional layer with a stride length of 1 is used everywhere. The output of these layers are passed to a fully-connected layer normalized by a LayerNorm operation (state of the art technique). Further, a hyperbolic tangent non-linear transform is applied to the 50-dim output of the fully-connected layer. The weight matrix of the fully connected and the convolutional layers are initialized by orthogonal initialization with bias set as zero.

Referring to the steps of the method 300, at step 310 includes sending via the one or more hardware processors, the plurality of high-level feature embeddings and a plurality of transition states associated with change in position of the plurality of target objects to an actor-critic network that repetitively computes a long-term goal for each episode, wherein the long-term goal is a region of the semantic map where the robot navigates in search of an instance of the plurality of target objects.

The actor critic network 208 of the system 100 utilizes the output of the encoder network 206 as input to the actor critic network 208. The actor and critic components of the actor critic network 208 work with the same weights in the convolutional layers but have separate encoders. The weights in the convolutional layers are allowed to be updated only by the optimizer in the critic network. The optimizer in the critic network is allowed to update these weights. Here, a clipped double Q learning method for the critic component is employed. Here, each Q-function is parameterized as a three-layer multi-layer perceptron (MLP) with ReLU activations after each layer except the last one. The plurality of transition states are stored using a replay buffer.

The plurality of transition states includes the semantic map, the plurality of target objects, an action state, a reward state, a semantic map computed at next timestep, and a next target object to be located among the plurality of target objects. The plurality of transition states are obtained from the replay buffer and the semantic map are given as input to the encoder network 206 and the actor critic network 208. Every timestep may be for example a value 25 where a new long-term goal is sampled. It is noted that both the actor component and critic component are used, and their parameters are revised, during training. Once trained, only the actor critic network 208 is used for testing.

Referring to the steps of the method 300, at step 312 includes receiving by the robot from the actor critic network executed by the one or more hardware processors, a deterministic local policy to compute a low-level navigational action to navigate along a shortest path calculated from a current location of the robot to the long-term goal to reach the target object among the plurality of target objects.

The actor critic network 208 computes the shortest path from the current location to the current long term goal. The deterministic local policy is used by the robot to compute the low-level navigational actions to navigate along the computed shortest path. When the long-term goal is provided by the actor critic network 206, the deterministic local policy uses the Fast Marching method (state of the art technique) to guide the robot to the region. The Fast Marching method uses the obstacle channel from the semantic map to compute the shortest path from the current location to the current long term goal. The shortest path is computed at every third timestep based on the current location of the robot and the next possible nearest instance of at least one target object among the plurality of target objects.

Referring to the steps of the method 300, at step 314 includes navigating from a current location to a next location of the target object from among the plurality of target objects based on the deterministic local policy, wherein a trained deep reinforcement learning network executed by the one or more hardware processors rewards the robot with at least one of a reward among a plurality of rewards for performing a navigational action on reaching each target object location among the plurality of target objects.

Referring to the steps of the method 300, at step 316 includes utilizing via the one or more hardware processors, a deep reinforcement learning network trained to assign the robot with a computed reward function when the navigational action is performed by the robot to reach an instance of the plurality of target objects, wherein the robot ends the task as one of a successful task when the plurality of target objects are successfully navigated by the robot, and a failure task when the semantic map predicts no space to navigate in the environment.

The robot is assigned with at least one of the reward among the plurality of rewards comprising a subgoal reward value $R_{subgoal}$, a process reward value $R_{process}$, and a negative reward value CNR. The robot receives the subgoal reward when it localizes an instance of at least one target object.

The reward function is a sum of the subgoal reward value, the process reward value, a scaling factor, and a negative reward value as below in equation 1, $$\text{Reward} = R_{subgoal} + \alpha_{process} * R_{process} + CNR \qquad \text{equation 1}$$

Where, $R_{subgoal}$ is the reward for achieving a subgoal, which is an instance of at least one of the target object, $R_{process}$ is the process reward, and CNR is the negative reward, where cost is assigned at every timestep. The value of CNR was set such that the penalty accrued over each episode was small relative to other parts of the reward function. The scaling factor $\alpha_{process}$=0.1 is determined experimentally to vary relative influence of $R_{process}$ on the overall behavior of the robot.

The robot receives the subgoal reward when it localizes an instance of at least one target objects. $R_{subgoal}$ is a standard reward the robot receives when it localizes an instance of at least one of the target object among the plurality of target objects. This $R_{subgoal}$ reward is only received at corresponding timestep as below in equation 2, $$R_{subgoal} = 1_{subgoal} * r_{subgoal} \qquad \text{equation 2}$$

Where, $1_{subgoal}$ is an indicator function that is equal to 1, if the robot reaches an instance of at least one of the target object.

$r_{subgoal}$ is an instantaneous real valued reward. Here, $R_{subgoal}$ can be redefined as below in equation 3, This $R_{subgoal}$ can be restated as below in equation 3, $$R_{subgoal} = \begin{cases} r_{subgoal} & \text{if a subgoal is reached} \\ 0 & \text{otherwise} \end{cases} \qquad \text{equation 3}$$

Further, experimentally set as $r_{subgoal}=2$ to be relatively higher than other two parts of the reward, in enabling the robot to reach the $R_{subgoal}$ with higher priority.

The robot receives the process reward $R_{process}$ for greedily attempting to localize instance of the plurality of target objects at a second timestep based on prior experiences in similar environments and a current episode learnings obtained while navigating to each target object. The second timestep may be for example a value of about 25. The process reward $R_{process}$ is a reward function that requires a trade-off with the first part of the reward subgoal reward $R_{subgoal}$. For instance, focusing on the shortest path to the specific region may help the robot to obtain the $r_{subgoal}$ as soon as possible but it may make sense to deviate from the region to another region nearby if an instance of another target objects is likely to be found there. Also, the distance to the nearest instance of each target object is computed at each timestep. During training known ground truth locations of the plurality of objects are necessary. The shortest distance is computed at each timestep t which is the total decrease in the geodesic distance to the nearest instance of each target object $g_i$ is in below equation 4, $$d_t = \sum_i^N \left( dtg_{i,t-1} - dtg_{i,t} \right) \qquad \text{equation 4}$$

Where, $dtg_{i,t-1}$ refers to the shortest distance to an instance of each target object i at timestep t; and N is the number of target objects whose instance remains to be localized in the episode.

The process reward $R_{process}$ is computed based on a total number of target objects whose instance remains to be localized in the current episode, the shortest path and a total number of objects present in the environment. Once $d_t$ is computed, $R_{process}$ is computed in equation 5, $$R_{process} = \begin{cases} \dfrac{n}{N} + d_t & \text{if } dtg \text{ of } n \text{ classes decreases} \\ d_t & \text{otherwise} \end{cases} \qquad \text{equation 5}$$

where the additional reward received depends on the fraction of the plurality of target objects to whose instances the robot was able to reduce its distance during the training episode. Here, the extra reward is dependent on the percentage of the total number of target items the robot was able to get closer to during the training episode. Consequently, assignment of the reward motivates the robot to localize the plurality of target objects at an instance, if it is possible, based on previous experience in related environments and on the observations made in the current episode. The reward function remains the same regardless of the quantity of each target object.

In one embodiment, the method of the present disclosure utilizes photo-realistic benchmark scenes (3D reconstructions of home environments) from the Gibson dataset in the AI Habitat simulator. The robot in each episode beginning position is drawn at random from the environment. For instance, the datasets for 2-ON and 3-ON tasks were produced utilizing five Gibson dataset scenes that considered during training. Each of the five scenes in this testing dataset has 200 episodes, for a total of 1000 episodes. The amount of scenes having one or more instances of the target object was lower for larger k, hence it did not explore k–ON tasks for k>3 in this dataset. The robot observations were in the form of 4×640×480 RGB-D captured plurality of images, and the success threshold $d_s=1$ m. The maximum episode length was about 1000 steps and 600 for the 3-ON and 2-ON episodes respectively.

"Random" refers to the task when the robot has no fixed object sequence, but the robot selects an action randomly in each timestep of each episode. Presequencing multi-object navigation is when the robot was given an order for example a sequence apriori in which the robot explores the plurality of target objects for trained deep RL technique.

When a robot is presequencing multi-object navigation, it is given an order, such as a sequence apriori, and is then instructed to investigate a variety of target objects using a trained deep RL approach.

Multi-Semantic Exploration (M-SemExp) is when the robot pursued the sequence agnostic multi-object navigation task where the deep RL method is extended for the Multi-ON setting. In particular, reward was specified as the total decrease in geodesic distance to the nearest instance of each object $g_i$ as given in equation 5, $$R_{SemExp} = \alpha_{SemExp} * \sum_i^N \left( dtg_{i,t-1} - dtg_{i,t} \right) \qquad \text{equation 5}$$

where $dtg_{i,t-1}$ is the shortest distance to an instance of target object $g_i$ at timestep t;

N is the number of each target object whose instance remains to be localized.

In one embodiment, the performance of the robot is evaluated based on a set of performance parameters comprising a success, a sub-success, a total number of timesteps, a global path length and a global shortest possible path length.

The success is an episode is successful if the robot successfully localizes an instance of each target object within the maximum number of steps allowed.

The sub-success is a ratio of the number of each target object whose instance has been localized to the total number of the plurality of target objects.

Timestep refers to the number of timesteps taken to successfully complete each particular episode.

Global path length is the length of the path (in meters) traversed by the robot to successfully identify an instance of each target object in each episode.

Global-SPL (G-SPL) first computes the shortest possible path g that locates one instance in each of the target object which is globally minimum path. Global-SPL is described in equation 6, $$G_{SPL} = (sccess) * \frac{g}{\max(g, p)} \qquad \text{equation 6}$$

Where, g is the ratio of length of the actual path taken by our robot in a particular episode and p is the length of the actual path traversed by the robot to localize an instance of at least one of the target object.

Figure 4:
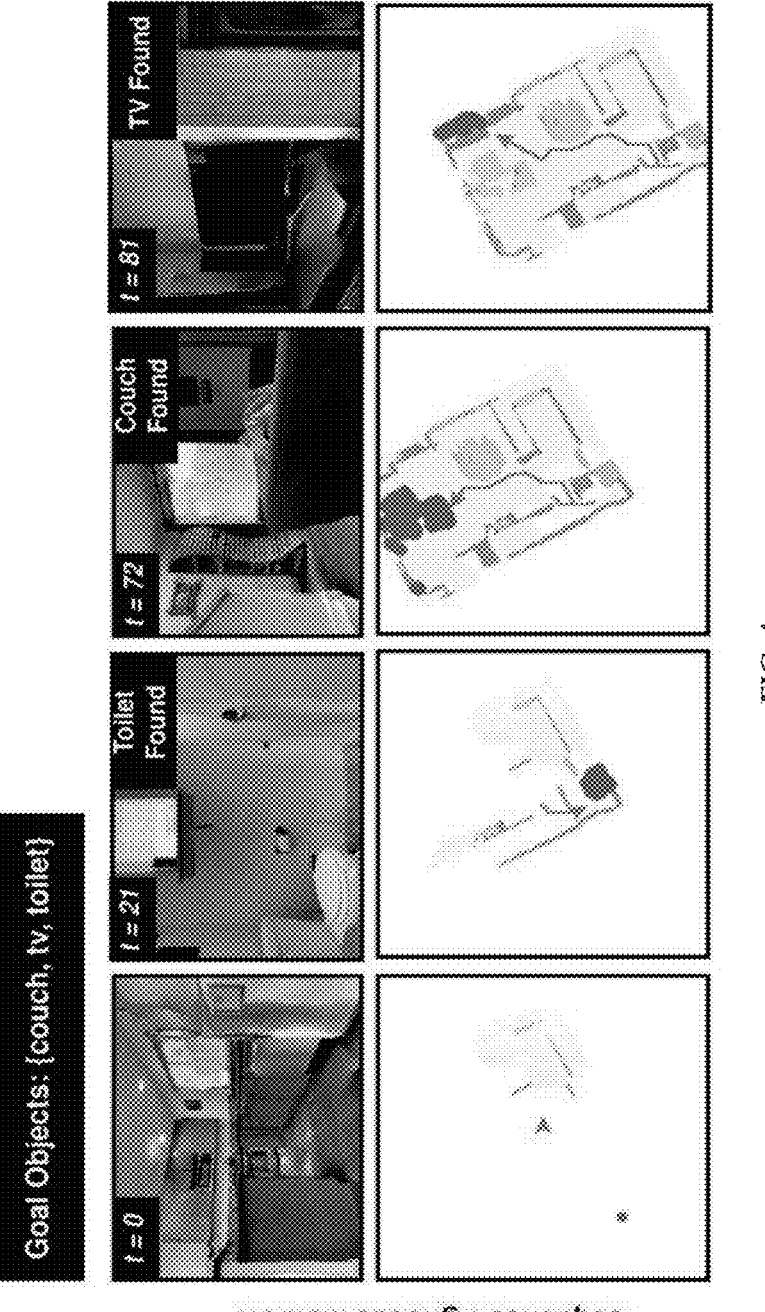
FIG. 4 is an example environment including the robot, the plurality of target objects to be tracked, and a plurality of obstacles using the system of FIG. 1, in accordance with some embodiments of the present disclosure.

FIG. 4 is an example environment including the robot, the plurality of target objects to be tracked, and a plurality of obstacles using the system of FIG. 1, in accordance with some embodiments of the present disclosure. In one embodiment, the method of the present disclosure provides the sequence {couch, tv, toilet} whereas that any instance of these target object has to be localized. The robot quickly moves toward and localizes a toilet in timestep value of about 21, localizes a couch by timestep value of about 72, and finds a TV by timestep value of about 81. Quantitative results shows evaluated quantitatively comparing with the baseline, with the results averaged over the successful episodes in 200 paired episodes which is same environment and robot starting position for both frameworks in each paired episode of five scenes summarized in Table 1.

TABLE 1

Performance of sequence agnostic multi-object navigation formulation compared with the pre-sequence object navigation formulation

| Scene | Timesteps ↓ | | Global Path Length (m) ↓ | |
|---|---|---|---|---|
| Name | PSM | SAM | PSM | SAM |
| Collierville | 242 | 122 | 29.53 | 16.16 |
| Corozal | 336 | 179 | 46.23 | 27.28 |
| Darden | 248 | 117 | 31.43 | 16.08 |
| Markleeville | 272 | 140 | 35.41 | 18.87 |
| Wiconsico | 389 | 224 | 52.81 | 33.94 |

In one embodiment, performance of sequence agnostic multi-object navigation formulation compared with the pre-sequence object navigation formulation. The target object sequence for the performance of sequence agnostic multi-object navigation technique is then specified as the order in which it ultimately localizes each target object. Table 2 summarizes the corresponding results for 2-ON and 3-ON tasks. The method of the present disclosure provides substantially better performance in all three of the measures considered. Also, performance improves when the number of target object increases from 2-ON to 3-ON. This is because of the associated increase in the maximum number of timesteps and the fact to concurrently reduce the distance to an instance of the plurality of target objects.

TABLE 2

Results of our SAM framework compared with the Random and M-SemExp baseline

| | Success (%) ↑ | | Sub-success (%) ↑ | | G-SPL (%) ↑ | |
|---|---|---|---|---|---|---|
| Scene Name | 2-ON | 3-ON | 2-ON | 3-ON | 2-ON | 3-ON |
| Random | 3.3 | 4.7 | 11.5 | 14.2 | 0 | 0 |
| M-SemExp | 60.5 | 61.7 | 73.1 | 76.6 | 30.5 | 29.8 |
| Multi-object navigation | 70.7 | 72.3 | 82.5 | 86.9 | 39.3 | 39.3 |

Ablation studies further explore the effect of the maximum number of allowed timesteps on performance of our framework compared with the M-SemExp baseline. Specifically, the maximum permissible number of timesteps from 200-600 for the 2-ON task, and from 300-1000 for the 3-ON task, with the results summarized in Table-3 and Table 4 respectively.

TABLE 3

2 ON task with the M-SemExp baseline for different values of the maximum number of timesteps allowed in each episode

| | M-SemExp | | Method of the present disclosure | |
|---|---|---|---|---|
| Timesteps | Success (%) | Sub-success (%) | Success (%) | Sub-success (%) |
| 600 | 60.5 | 73.1 | 70.7 | 82.5 |
| 300 | 49.6 | 67.2 | 60.3 | 77.1 |
| 200 | 34.7 | 56.5 | 48.6 | 70.2 |

TABLE 4

3 ON task with the M-SemExp baseline for different values of the maximum number of timesteps allowed in each episode

| | M-SemExp | | Method of the present disclosure | |
|---|---|---|---|---|
| Timesteps | Success (%) | Sub-success (%) | Success (%) | Sub-success (%) |
| 1000 | 61.71 | 76.6 | 72.3 | 86.9 |
| 500 | 41.34 | 64.6 | 63.7 | 84.3 |
| 300 | 32.49 | 55.0 | 45.3 | 76.4 |

It is observed that the degradation in performance as the maximum number of timesteps is reduced is less with our framework than with M-SemExp. This is because of the sequence agnostic approach pursued and the fact that reward function encourages the robot to reduce the distance to multiple objects simultaneously and thus localize instances of the plurality of target objects in fewer steps.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein addresses unresolved problem of object navigation. The embodiment thus provides method and system for multi-object tracking and navigation without pre-sequencing. Moreover, the embodiments herein further provides a deep reinforcement learning method for sequence agnostic multi-object navigation. The robot obtains a set of long-term goal that greedily aim to simultaneously minimize the distance to an instance of the plurality of target objects by drawing on prior knowledge of environments with a comparable distribution of regions and objects. Instead of analyzing all feasible routes through different points in the domain, one might compute the globally optimal sequence of trajectories. The technique offers a framework for deep reinforcement learning (RL) with a reward specification and modifies the actor-critic network to reward concurrent progress to examples of many target object rather than progress towards recognizing an instance of a single target object.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method for multi-object tracking and navigation, the method further comprising:

continuously receiving a plurality of images of an environment via a sensor controlled by one or more hardware processors of a robot while in motion, wherein each of the plurality of images comprises a plurality of objects present in a field of view of the robot, and receiving by the robot, a user task further comprising a plurality of target objects from among the plurality of objects to be located in the environment;

iteratively creating via the one or more hardware processors, a semantic map of the environment at every first timestep of each episode by using an odometry pose readings and Red, Green, Blue-Depth (RGB-D) observations of the plurality of objects, wherein the semantic map indicates the robot, an arrangement of a plurality of obstacles, the plurality of objects and an associated vacant space in the environment;

identifying by the robot executed via the one or more hardware processors, the plurality of target objects from among the plurality of objects by processing the semantic map;

extracting via an encoder network executed by the one or more hardware processors, a plurality of high-level feature embeddings of the plurality of target objects by using the semantic map and dynamically identifying change in position of the plurality of target objects and the robot in the environment;

sending via the one or more hardware processors, the plurality of high-level feature embeddings and a plurality of transition states associated with change in position of the plurality of target objects to an actor-critic network that repetitively computes a long-term goal for each episode, wherein the long-term goal is a region of the semantic map where the robot navigates in search of a first instance of the plurality of target objects;

receiving by the robot from the actor critic network executed by the one or more hardware processors, a deterministic local policy to compute a navigational action to navigate along a shortest path calculated from a current location of the robot to the long-term goal to reach the target object among the plurality of target objects;

navigating from a current location to a next location of the target object from among the plurality of target objects based on the deterministic local policy, wherein a trained deep reinforcement learning network executed by the one or more hardware processors rewards the robot with at least one of a reward among a plurality of rewards for performing a navigational action on reaching each target object location among the plurality of target objects; and utilizing via the one or more hardware processors, a deep reinforcement learning network trained to assign the robot with a computed reward function when the navigational action is performed by the robot to reach the first instance of the plurality of target objects, wherein the robot ends the task as one of a successful task when the plurality of target objects are successfully navigated by the robot, and a failure task when the semantic map predicts no space to navigate in the environment.

2. The processor implemented method as claimed in claim 1, wherein the plurality of rewards includes a subgoal reward value, a process reward value, and a negative reward value, wherein the process reward is computed based on a total number of target objects whose instance remains to be localized in the current episode, the shortest path and a total number of objects present in the environment.

3. The processor implemented method as claimed in claim 1, wherein the reward function is a sum of the subgoal reward value, the process reward value, a scaling factor, and a negative reward value.

4. The processor implemented method as claimed in claim 1, wherein the robot receives the subgoal reward when it localizes a second instance of at least one target object.

5. The processor implemented method as claimed in claim 1, wherein the robot receives the process reward for greedily attempting to localize a second instance of the plurality of target objects at a second timestep based on prior experiences in similar environments and a current episode learnings obtained while navigating to each target object.

6. The processor implemented method as claimed in claim 1, wherein the shortest path is computed at every third timestep based on the current location of the robot and a next possible nearest instance of at least one of the target objects among the plurality of target objects.

7. The processor implemented method as claimed in claim 1, wherein the robot executes at least one of the four actions including a move-forward, a turn-left, a turn-right and a stop, wherein the turn-left and the turn-right actions causes the robot to rotate between random degrees in the range between 1° to 60°.

8. The processor implemented method as claimed in claim 1, wherein a random shift augmentation amongst a plurality of data augmentation techniques is applied over the semantic map to adapt the robot to an unknown environment.

9. The processor implemented method as claimed in claim 1, evaluating the performance of the robot based on a set of performance parameters further comprising a success, a sub-success, a total number of timesteps, a global path length and a global shortest possible path length.

10. The processor implemented method as claimed in claim 1, wherein the plurality of transition states includes the semantic map, the plurality of target objects, an action state, a reward state, a semantic map computed at next timestep, and a next target object to be located among the plurality of target objects.

11. A system for multi-object tracking and navigation, further comprising:
   a memory storing instructions;
   one or more communication interfaces; and
   one or more hardware processors coupled to the memory via the one or more communication interfaces, wherein the one or more hardware processors are configured by the instructions to:
      continuously receive a plurality of images of an environment via a sensor controlled of a robot while in motion, wherein each of the plurality of images comprises a plurality of objects present in a field of view of the robot, and receiving by the robot, a user task further comprising a plurality of target objects from among the plurality of objects to be located in the environment;
      iteratively create a semantic map of the environment at every first timestep of each episode by using an odometry pose readings and RGB-D observations of the plurality of objects, wherein the semantic map indicates the robot, an arrangement of a plurality of obstacles, the plurality of objects and an associated vacant space in the environment;
      identify by the robot executed the plurality of target objects from among the plurality of objects by processing the semantic map;
      extract via an encoder network a plurality of high-level feature embeddings of the plurality of target objects by using the semantic map and dynamically identifying change in position of the plurality of target objects and the robot in the environment;
      send the plurality of high-level feature embeddings and a plurality of transition states associated with change in position of the plurality of target objects to an actor-critic network that repetitively computes a long-term goal for each episode, wherein the long-term goal is a region of the semantic map where the robot navigates in search of a first instance of the plurality of target objects;
      receive by the robot from the actor critic network a deterministic local policy to compute a navigational action to navigate along a shortest path calculated from a current location of the robot to the long-term goal to reach the target object among the plurality of target objects;
      navigate from a current location to a next location of the target object from among the plurality of target objects based on the deterministic local policy, wherein a trained deep reinforcement learning network executed by the robot with at least one of a reward among a plurality of rewards for performing a navigational action on reaching each target object location among the plurality of target objects; and
      utilize a deep reinforcement learning network trained to assign the robot with a computed reward function when the navigational action is performed by the robot to reach the first instance of the plurality of target objects, wherein the robot ends the task as one of a successful task when the plurality of target objects are successfully navigated by the robot, and a failure task when the semantic map predicts no space to navigate in the environment.

12. The system of claim 11, wherein the plurality of rewards includes a subgoal reward value, a process reward value, and a negative reward value, wherein the process reward is computed based on a total number of target objects whose instance remains to be localized in the current episode, the shortest path and a total number of objects present in the environment, wherein the reward function is a sum of the subgoal reward value, the process reward value, a scaling factor, and a negative reward value.

13. The system of claim 11, wherein the robot receives the subgoal reward when it localizes a second instance of at least one target object.

14. The system of claim 11, wherein the robot receives the process reward for greedily attempting to localize a second instance of the plurality of target objects at a second timestep based on prior experiences in similar environments and a current episode learnings obtained while navigating to each target object.

15. The system of claim 11, wherein the shortest path is computed at every third timestep based on the current location of the robot and a next possible nearest instance of at least one of the target objects among the plurality of target objects.

16. The system of claim 11, wherein the robot executes at least one of the four actions including a move-forward, a turn-left, a turn-right and a stop, wherein the turn-left and the turn-right actions causes the robot to rotate between random degrees in the range between 1° to 60°.

17. The system of claim 11, wherein a random shift augmentation amongst a plurality of data augmentation techniques is applied over the semantic map to adapt the robot to an unknown environment.

18. The system of claim 11, evaluating the performance of the robot based on a set of performance parameters further comprising a success, a sub-success, a total number of timesteps, a global path length and a global shortest possible path length.

19. The system of claim 11, wherein the plurality of transition states includes the semantic map, the plurality of target objects, an action state, a reward state, a semantic map computed at next timestep, and a next target object to be located among the plurality of target objects.

20. One or more non-transitory machine-readable information storage mediums comprising one or more instructions which when executed by one or more hardware processors cause:

continuously receiving a plurality of images of an environment via a sensor controlled by one or more hardware processors of a robot while in motion, wherein each of the plurality of images comprises a plurality of objects present in a field of view of the robot, and receiving by the robot, a user task further comprising a plurality of target objects from among the plurality of objects to be located in the environment;

iteratively creating a semantic map of the environment at every first timestep of each episode by using an odometry pose readings and RGB-D observations of the plurality of objects, wherein the semantic map indicates the robot, an arrangement of a plurality of obstacles, the plurality of objects and an associated vacant space in the environment;

identifying by the robot executed the plurality of target objects from among the plurality of objects by processing the semantic map;

extracting via an encoder network a plurality of high-level feature embeddings of the plurality of target objects by using the semantic map and dynamically identifying change in position of the plurality of target objects and the robot in the environment;

sending the plurality of high-level feature embeddings and a plurality of transition states associated with change in position of the plurality of target objects to an actor-critic network that repetitively computes a long-term goal for each episode, wherein the long-term goal is a region of the semantic map where the robot navigates in search of a first instance of the plurality of target objects;

receiving by the robot from the actor critic network a deterministic local policy to compute a navigational action to navigate along a shortest path calculated from a current location of the robot to the long-term goal to reach the target object among the plurality of target objects;

navigating from a current location to a next location of the target object from among the plurality of target objects based on the deterministic local policy, wherein a trained deep reinforcement learning network rewards the robot with at least one of a reward among a plurality of rewards for performing a navigational action on reaching each target object location among the plurality of target objects; and utilizing a deep reinforcement learning network trained to assign the robot with a computed reward function when the navigational action is performed by the robot to reach the first instance of the plurality of target objects, wherein the robot ends the task as one of a successful task when the plurality of target objects are successfully navigated by the robot, and a failure task when the semantic map predicts no space to navigate in the environment.

\* \* \* \* \*